US011572653B2

(12) United States Patent
Lam (10) Patent No.: US 11,572,653 B2
(45) Date of Patent: Feb. 7, 2023

(54) INTERACTIVE AUGMENTED REALITY (71) Applicant: ZYETRIC AUGMENTED REALITY LIMITED, Kowloon (HK)

(72) Inventor: Pak Kit Lam, Kowloon (HK)

(73) Assignee: ZYETRIC AUGMENTED REALITY LIMITED, Kowloon (HK)

(*) Notice: Subject to any disclaimer, the term of this patent is extended or adjusted under 35 U.S.C. 154(b) by 0 days.

(21) Appl. No.: 16/492,578

(22) PCT Filed: Mar. 9, 2018

(86) PCT No.: PCT/IB2018/000320
§ 371 (c)(1),
(2) Date: Sep. 9, 2019

(87) PCT Pub. No.: WO2018/162985
PCT Pub. Date: Sep. 13, 2018

(65) Prior Publication Data
US 2020/0050259 A1 Feb. 13, 2020

Related U.S. Application Data (60) Provisional application No. 62/470,179, filed on Mar. 10, 2017.

(51) Int. Cl.
G06F 3/01 (2006.01)
G06F 3/04845 (2022.01)
(Continued)

(52) U.S. Cl.
CPC ............ D06F 39/14 (2013.01); A63F 13/213 (2014.09); A63F 13/655 (2014.09); A63F 13/92 (2014.09);
(Continued)

(58) Field of Classification Search
CPC ....... G09G 5/08; A63F 13/213; A63F 13/655; A63F 13/92; A63F 13/57; G06F 3/048;
(Continued)

(56) References Cited

U.S. PATENT DOCUMENTS 10,488,941 B2 * 11/2019 Lam ...................... G06F 1/1694
2011/0216060 A1 * 9/2011 Weising ................... G09G 5/08
345/419
(Continued)

FOREIGN PATENT DOCUMENTS

WO 2018/162985 A1 9/2018

OTHER PUBLICATIONS

International Search Report and Written Opinion received for PCT Patent Application No. PCT/IB2018/000320, dated Aug. 14, 2018, 7 pages.

(Continued)

Primary Examiner — Jennifer N Welch
Assistant Examiner — Qi Wan
(74) Attorney, Agent, or Firm — Morrison & Foerster LLP (57) ABSTRACT An electronic device having a display on one side of the device and one or more image sensors on the opposite side of the device captures image data using the one or more image sensors. The display displays a portion of the captured image data on the display and a first graphical object overlaid on the displayed portion of the captured image data. A user gesture is detected using the one or more image sensors. In accordance with a determination that the detected user gesture meets a set of criteria, a position of the graphical object is updated based on the user gesture or is the first graphical object is replaced with a second graphical object. In accordance with a determination that the detected user (Continued)

gesture does not meet a set of criteria, the display of the first graphical object is maintained.

18 Claims, 8 Drawing Sheets

(51) Int. Cl.
| | |
|---|---|
| D06F 39/14 | (2006.01) |
| D06F 37/26 | (2006.01) |
| F26B 9/06 | (2006.01) |
| F26B 25/12 | (2006.01) |
| G06F 3/04815 | (2022.01) |
| A63F 13/213 | (2014.01) |
| G06T 11/00 | (2006.01) |
| A63F 13/655 | (2014.01) |
| A63F 13/92 | (2014.01) |
| D06F 37/42 | (2006.01) |
| G06V 20/20 | (2022.01) |
| G06V 40/20 | (2022.01) |
| D06F 58/04 | (2006.01) |
| G06T 19/00 | (2011.01) |

(52) U.S. Cl.
CPC ............ *D06F 37/263* (2013.01); *D06F 37/42* (2013.01); *F26B 9/06* (2013.01); *F26B 25/12* (2013.01); *G06F 3/011* (2013.01); *G06F 3/04815* (2013.01); *G06F 3/04845* (2013.01); *G06T 11/00* (2013.01); *G06V 20/20* (2022.01); *G06V 40/28* (2022.01); *D06F 58/04* (2013.01); *G06T 19/006* (2013.01)

(58) Field of Classification Search
CPC ... G06F 3/011; G06K 9/00; F26B 9/06; F26B 25/12; D06F 58/04; G06T 11/00; G06T 19/006
See application file for complete search history.

(56) References Cited

U.S. PATENT DOCUMENTS

| | | | |
|---|---|---|---|
| 2013/0022274 A1* | 1/2013 | Lawrence Ashok Inigo | G06F 3/04847 382/195 |
| 2013/0169573 A1* | 7/2013 | Nishio | G06F 3/0488 345/173 |
| 2013/0257736 A1* | 10/2013 | Hou | G06F 3/042 345/168 |
| 2013/0307875 A1* | 11/2013 | Anderson | G06T 19/006 345/633 |
| 2014/0068526 A1* | 3/2014 | Figelman | G06F 3/005 715/863 |
| 2014/0071164 A1* | 3/2014 | Saklatvala | G06F 3/04815 345/633 |
| 2014/0157206 A1* | 6/2014 | Ovsiannikov | G06F 3/011 715/849 |
| 2014/0218361 A1 | 8/2014 | Abe et al. | |
| 2014/0235311 A1* | 8/2014 | Weising | A63F 13/00 463/14 |
| 2014/0292810 A1 | 10/2014 | Tsurumi | |
| 2015/0029223 A1* | 1/2015 | Kaino | G09G 3/002 345/633 |
| 2015/0356788 A1 | 12/2015 | Abe et al. | |
| 2017/0324841 A1* | 11/2017 | Clement | A63F 13/573 |
| 2018/0336008 A1* | 11/2018 | Nakagawa | G06V 40/28 |

OTHER PUBLICATIONS

International Preliminary Report on Patentability received for PCT Patent Application No. PCT/IB2018/000320, dated Sep. 19, 2019, 5 pages.

* cited by examiner

INTERACTIVE AUGMENTED REALITY

CROSS-REFERENCE TO RELATED APPLICATIONS

This application is a U.S. National Phase Patent Application under 35 U.S.C. § 371 of International Application No. PCT/IB2018/000320, filed Mar. 9, 2018, which claims priority to and the benefit of U.S. Provisional Patent Application Ser. No. 62/470,179, entitled "Interactive Augmented Reality", filed Mar. 10, 2017, the content of which is hereby incorporated by reference for all purposes.

FIELD

The present disclosure relates to augmented reality (AR) environments and, more specifically, to interacting with AR environments.

BACKGROUND

Virtual reality (VR) environments are entirely or mostly computer generated environments. While they may incorporate images or data from the real world, VR environments are computer generated based on the parameters and constraints set out for the environment. In contrast, augmented reality (AR) environments are largely based on data (e.g., image data) from the real world that is overlaid or combined with computer generated objects and events. Aspects of these technologies have been used separately using dedicated hardware.

SUMMARY

Below, embodiments of present technology are described that allow for interaction with AR environments using sensors present on smart devices, such as phones and tablet computers. The interactive augmented reality (AR) technologies described herein present an improved method for using these technologies and the open possibility of using the technologies on new platforms.

In some embodiments of the present technology, an electronic device having a display on one side of the device and one or more image sensors on the opposite side of the device captures image data using the one or more image sensors. Display displays a portion of the captured image data and a first graphical object overlaid on the displayed portion of the captured image data. A user gesture is detected in the image data. In accordance with a determination that the detected user gesture meets a set of criteria, the electronic device updates a position of the graphical object based on the user gesture or replaces the display of the first graphical object with a second graphical object. In accordance with a determination that the detected user gesture does not meet a set of criteria, the electronic device maintains the display of the first graphical object.

In some embodiments of an electronic device having a display on one side of the device and one or more image sensors on the opposite side of the device captures image data of a scene using the one or more image sensors. The display displays a portion of the captured image data and a first graphical object overlaid on the displayed portion of the captured image data at a first position, the first graphical object representing a virtual object. The electronic device detects a user gesture from the captured image data and, in accordance with a determination that the detected user gesture meets a set of criteria, updates a status of the virtual object and updates the position of the graphical object based on the user gesture or replaces the display of the first graphical object with a second graphical object that is associated with the updated status of the virtual object.

BRIEF DESCRIPTION OF THE FIGURES

The present application can be best understood by reference to the figures described below taken in conjunction with the accompanying drawing figures, in which like parts may be referred to by like numerals.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the present technology. Thus, the disclosed technology is not intended to be limited to the examples described herein and shown, but is to be accorded the scope consistent with the claims.

In embodiments of this invention, techniques are provided for interacting with AR environments using gestures, such as hand gestures detectable in image data or other forms of detectable movement, to produce realistic experiences in games or other applications. Below, the following concepts are used to describe some embodiments of the present technology:

Local Object—The objects that are "local" to the user and are not "seen" from the front- or back-facing camera. In other words, these are computer generated objects being displayed on the screen of the smart device but are not part of the AR and/or VR environment in a way that is accessible to other users.

IAR Background—The real-time "background" view seen from the back-facing camera in some IAR games (e.g., card games or create-capturing games) or applications.

IAR Object—The computerized object overlaid onto the IAR Background. In contrast to local objects, these objects are shared among other users (when present) of the AR and/or VR environment.

IAR View—A display of the combined IAR Background and IAR Object(s) and/or Local Object(s). For example, the display may be of the view generated from a virtual camera in or a virtual portal into an AR and/or VR environment. The positioning of the virtual camera is optionally based on position and/or orientation of the smart device that is displaying the view.

Figure 1A:
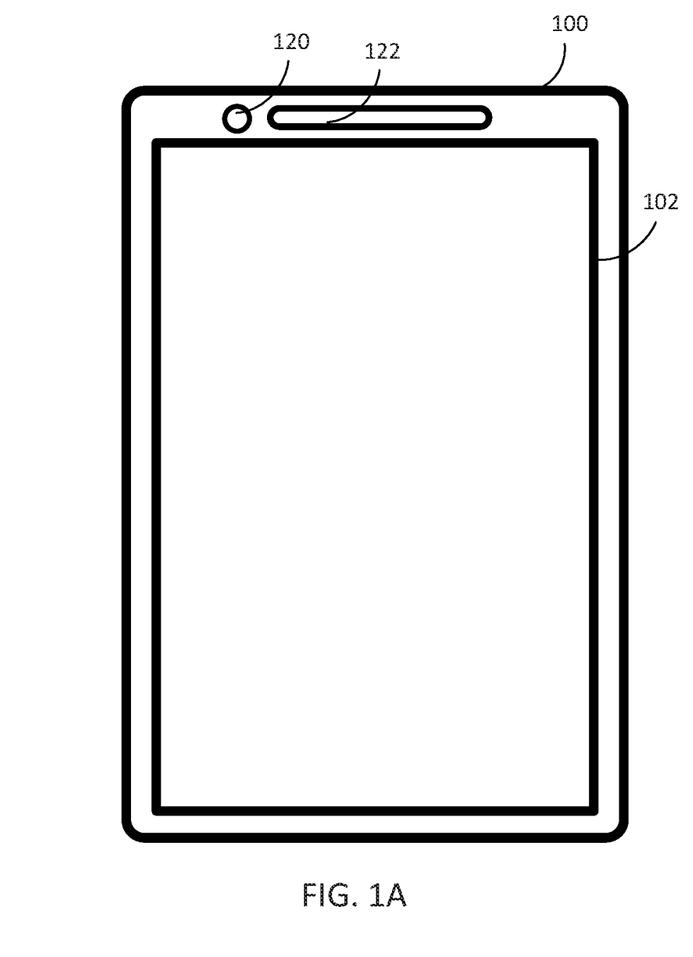
FIGS. 1A-1B depict an exemplary electronic device that implements some embodiments of the present technology.
Figure 1B:
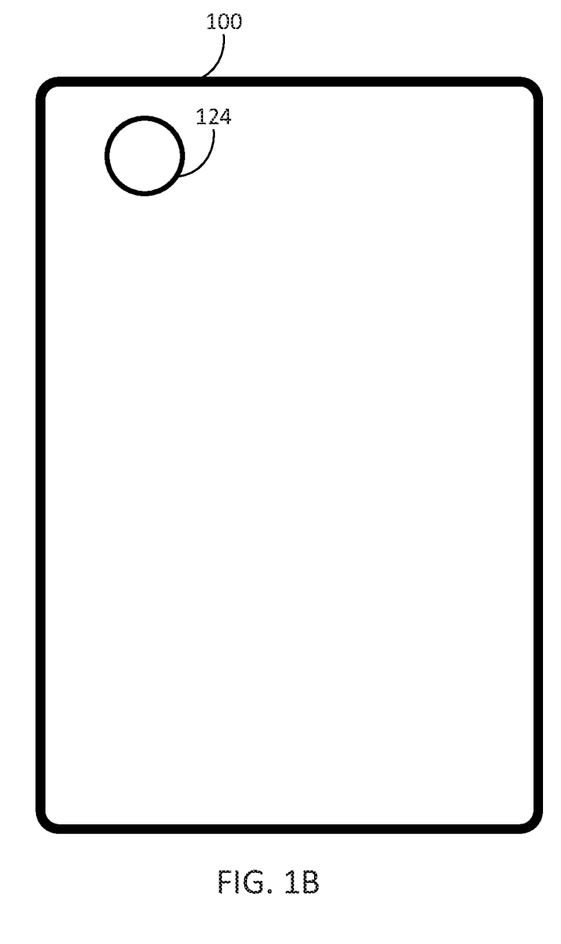

FIG. 1 depicts smart device 100 that can implement embodiments of the present technology. In some examples, smart device 100 is a smart phone or tablet computing device but the present technology can also be implemented on other types of electronic devices, such as wearable devices or a laptop computer. In some embodiments smart device 100 is similar to and includes all or some of components of computing system 900 described below in FIG. 9. In some embodiments, smart device 100 includes touch sensitive display 102 and back facing camera 124. In some embodiments, smart device 100 also includes front-facing camera 120 and speaker 122. Smart device 100 optionally also includes other sensors, such as microphones, movement/orientation sensors (e.g., one or more accelerometers, gyroscopes, digital compasses, etc.), depth sensors (which are optionally part of camera 120 and/or camera 124), etc.

Figure 2:
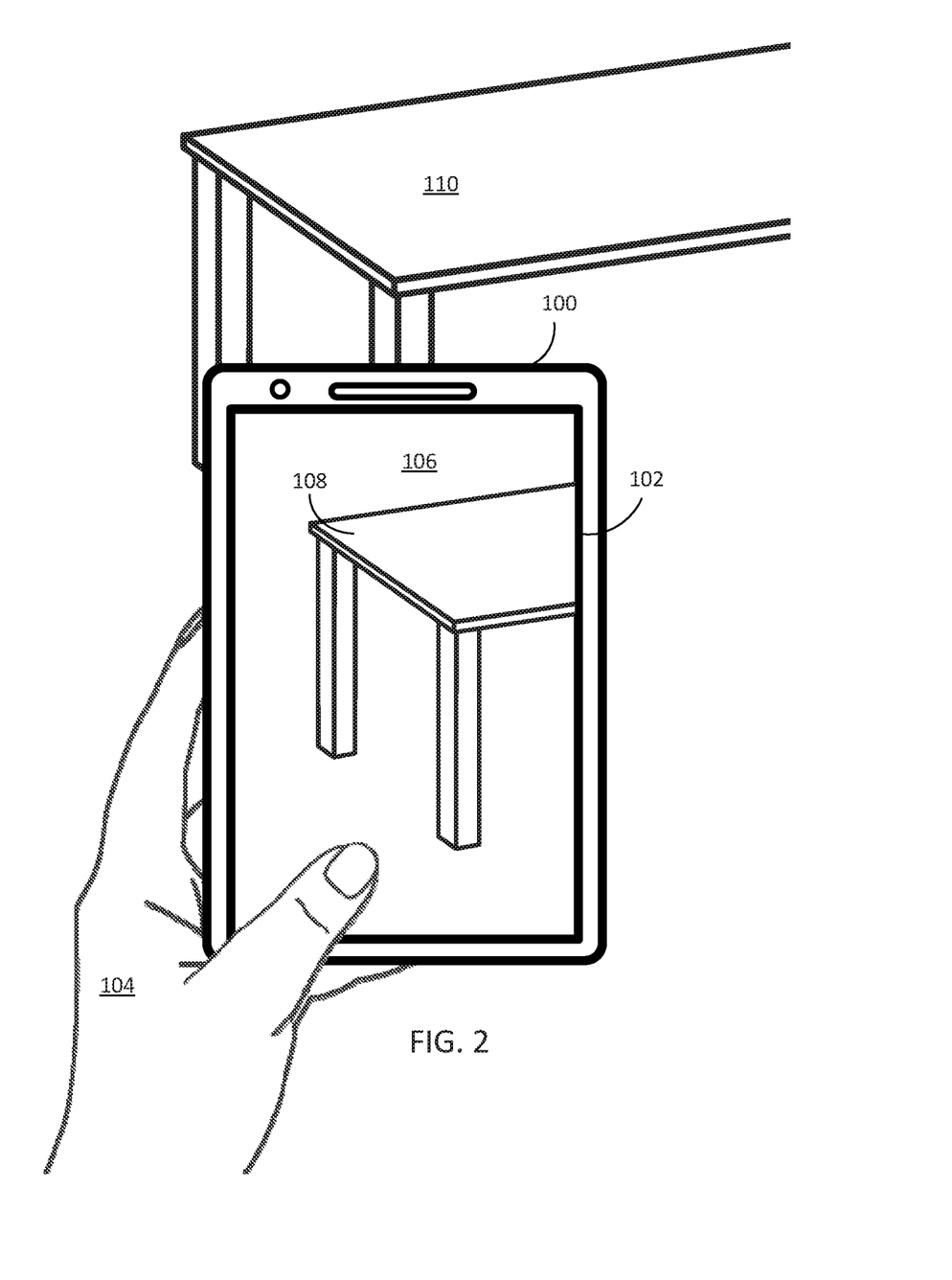
FIG. 2 depicts an example of a view on a handheld smart device with a live background.

Examples of the IAR concepts described above are illustrated in FIGS. 2 and 3A-3B. FIG. 2 depicts smart device 100 displaying an IAR view that includes IAR background 106 on display 102. For example, the IAR background may simply be live image data (e.g., video or still images) captured using a back facing camera of the smart device. In FIG. 2, IAR background 106 is a live image (e.g., captured with the back facing camera) that includes image data 108 of the scene that includes real world table 110.

Figure 3A:
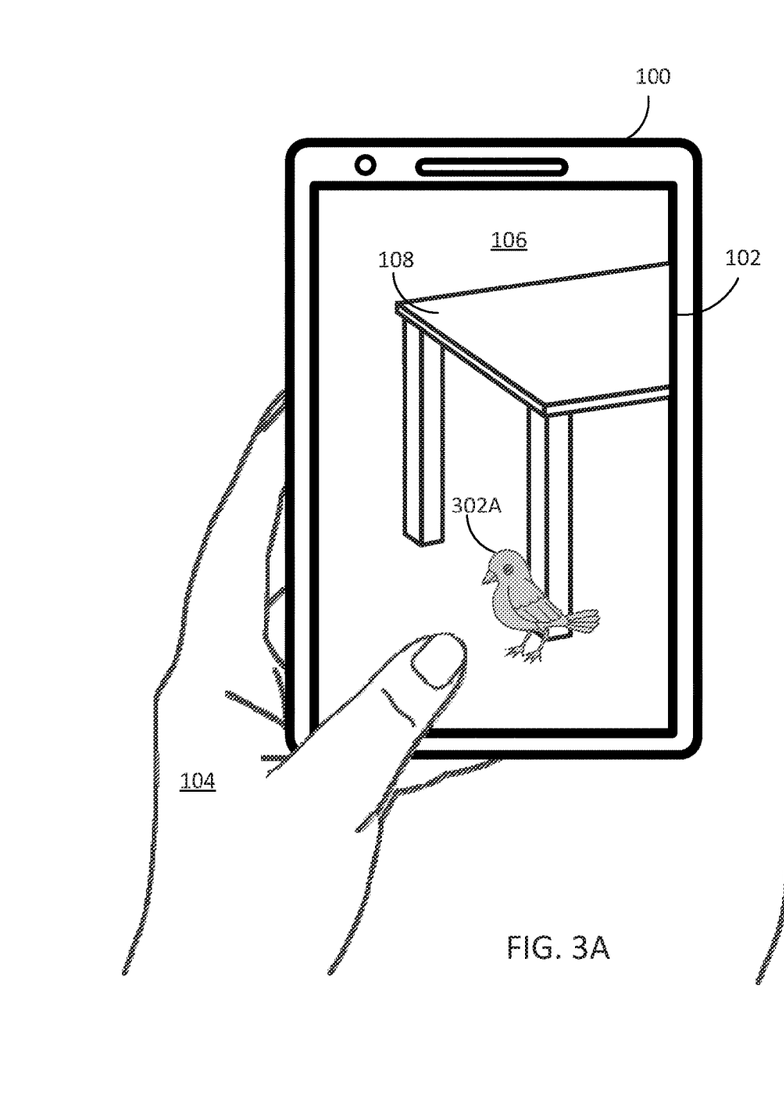
FIGS. 3A-3B depicts an example of an AR view on a handheld smart device with a live background, an AR object, and a user's hand.
Figure 3B:
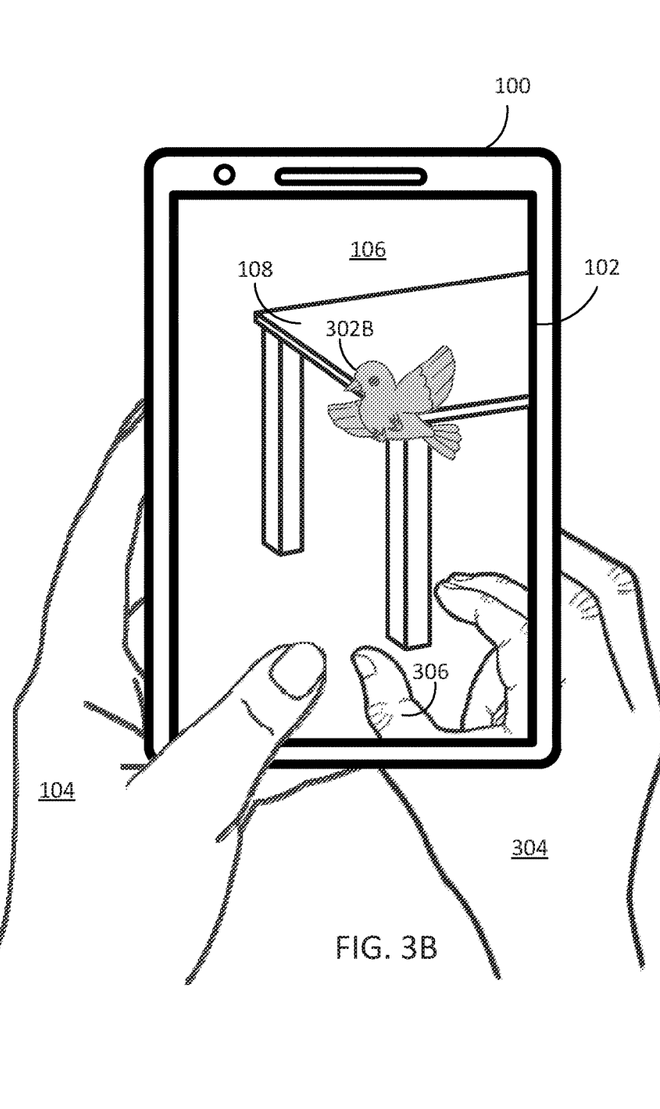

FIG. 3A depicts an IAR view on smart device 100 that includes IAR background 106 and IAR object represented by bird 302A (e.g., generated using computer graphics and overlaid onto the IAR background). In this example and other described below, the IAR object could alternatively be a local object. FIG. 3B depicts an IAR view on smart device 100 having IAR background 106 (which now also includes image data 306 of real world user hand 304) and IAR object (the same IAR object as in FIG. 3A) represented by bird 302B. The back facing camera of smart device 100 may detect movement/positioning/pose of user hand 304, which smart device 100 may interpret as a gesture that causes smart device 100 to modify the IAR environment. For example, FIG. 3B depicts one moment in the process of capturing an IAR gesture based on detection of the user's hand. For example, the user's hand, in some embodiments, is detected using image processing techniques based on visible image data and/or depth map data obtained from the back facing camera.

For the sake of easy understanding, various gaming/application scenarios are described to illustrate embodiments of the present technology. In these illustrations, we assume each user is using a connected smart device (e.g., Android or iOS smartphone or tablet) with both front-facing and back-facing cameras.

In an example of a first embodiment (e.g. a creature-catching game), sensors (e.g., a camera or motion sensors) on the smart device are used to determine how a user is interacting with an IAR object. Suppose a player is playing a creature-catching game, and wins by catching a moving virtual bird (e.g., a bird that walks, runs, or flies) using hand movements in front of the back-facing camera. In addition, the player may be required to get "close" enough to the virtual bird (e.g., by moving the smart device or their hand closer to the IAR object) before the virtual bird is caught.

Figure 4:
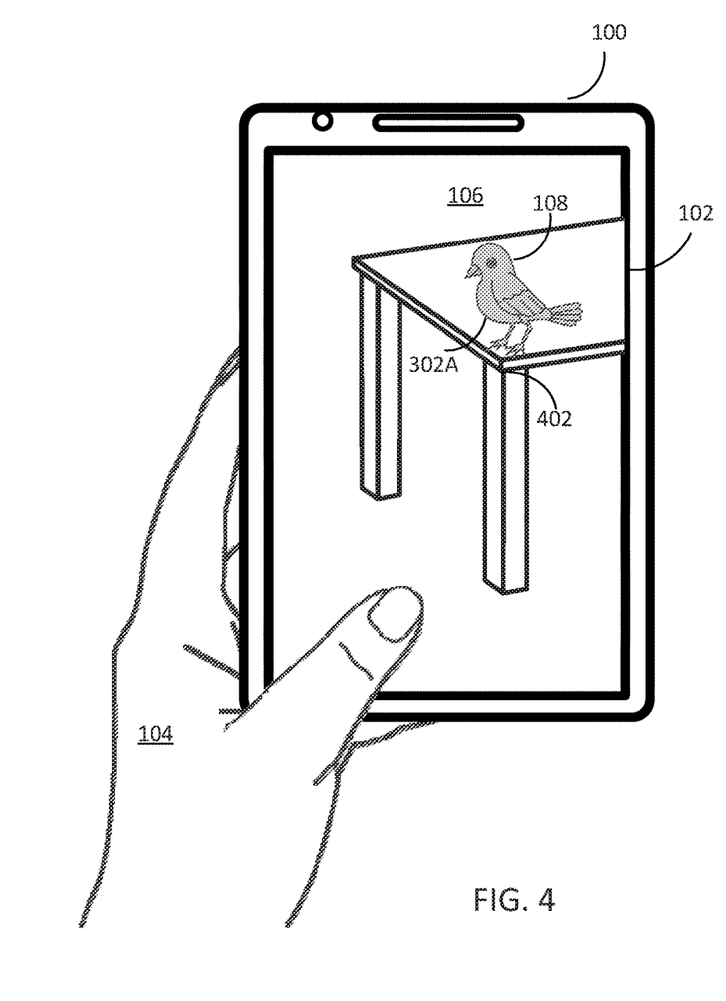
FIG. 4 depicts an example of an AR object reference point.

In one embodiment, the gaming algorithm would involve, based on the captured image data from the back-facing camera, determining the initial location of the bird(s) (e.g., the bird should be located on top of some flat surface, instead of in the middle of the air without support). Once the initial location of a particular bird has been determined, the algorithm can also determine a reference point based on a location of a feature in the IAR background. For example, if the bird is located next to an object with a corner, such as a rectangular table, then the corner of the object in the real world may be set as the reference point of the monster. FIG. 4 depicts this concept. In FIG. 4, the IAR object represented by bird 302A has an initial location defined with respect to reference point 402.

Figure 5:
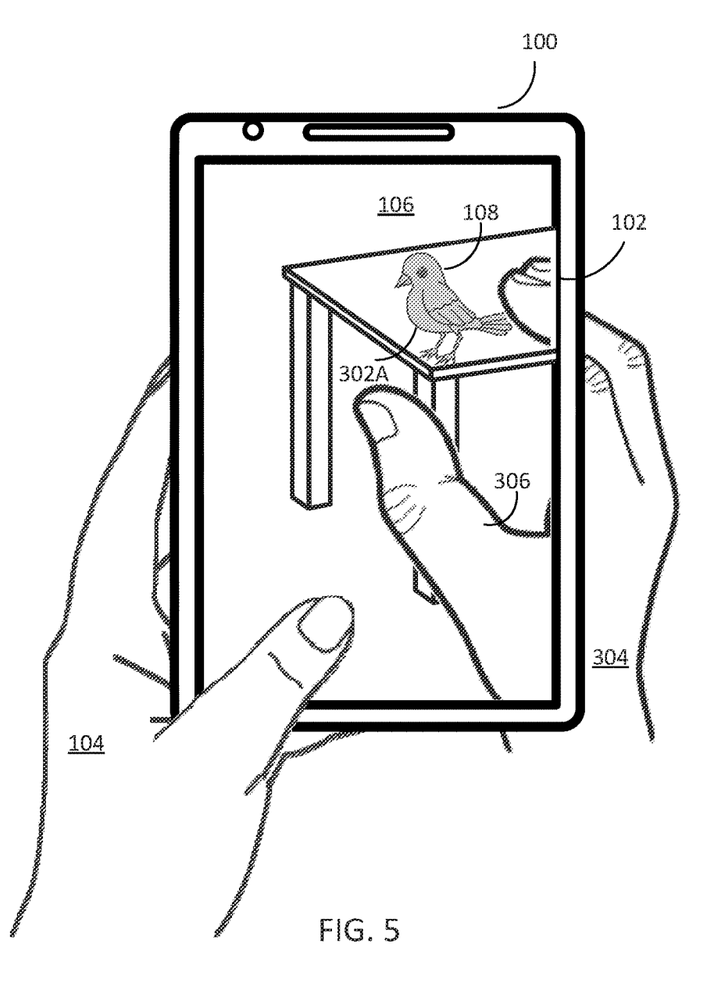
FIG. 5 depicts an example of a user interacting with an AR object at a far distance in an AR view based on a reference point.

In FIG. 5, while the player moves toward bird 302A, which represents the IAR object, the algorithm calculates the distance between the player and the referenced point using augmented reality technologies. For example, the algorithm may use depth information and/or image processing techniques to determine the distance to the reference point for bird 302A.

Figure 6:
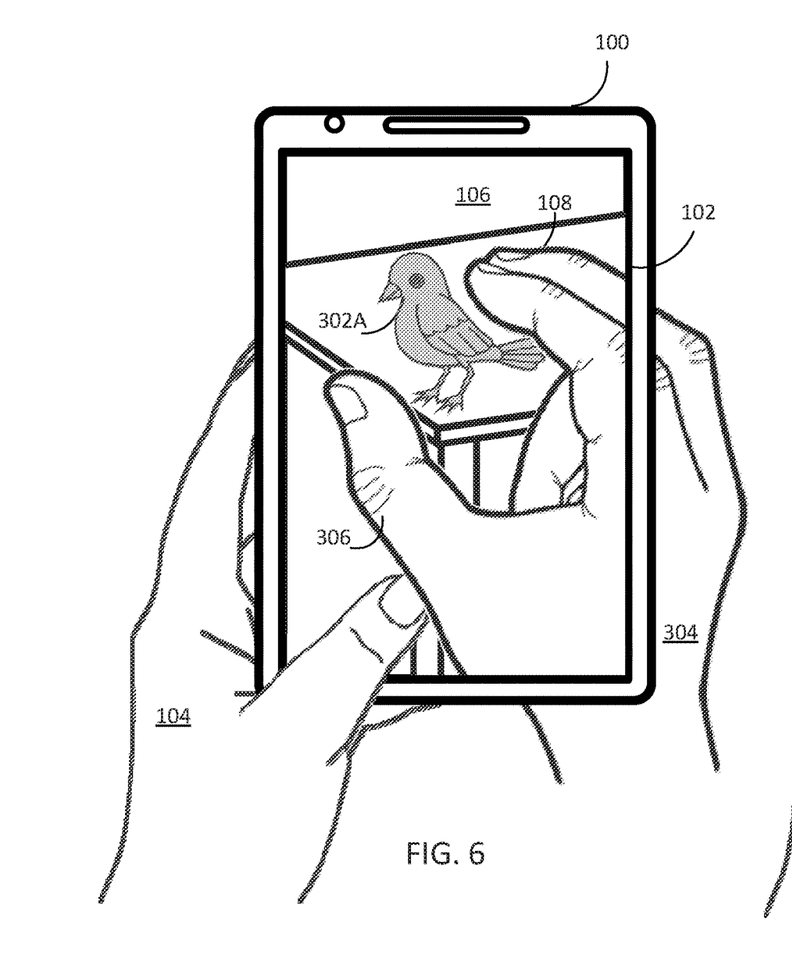
FIG. 6 depicts an example of a user interacting with an AR object at a closer distance in an AR view based on a reference point.
Figure 7:
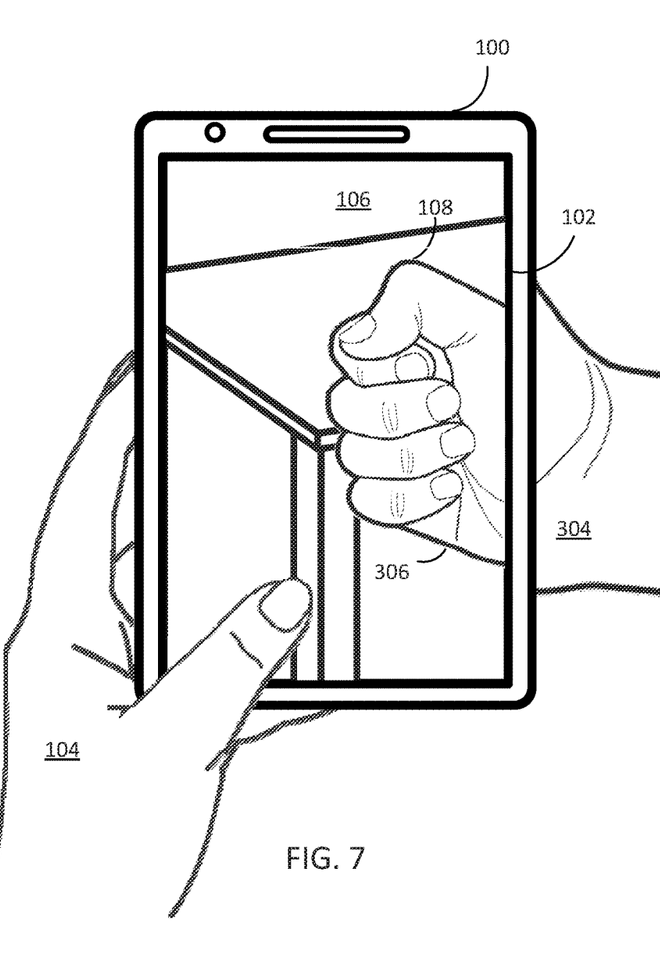
FIG. 7 depicts an example of an updated AR view showing that the user has captured the AR object.

The size of bird 302A may also change proportionally according to the calculated distance. For example, in FIG. 6, the player has gotten closer to bird 302A (e.g., by moving smart device 100 closer to the reference point or moving just hand 304 closer to the reference point on the table). Thus, the closer the player gets to the bird, the larger 302A will appear on the IAR view (e.g., compare size of bird 302A in FIGS. 5 and 6). If the player is not close enough to the reference point, regardless what the player does, the player will not be able to "catch" bird 302A. On the other hand, if the player's hand (hand 304) is close enough to the reference point and hand 304 performs the proper gesture (e.g., a pinch gesture or grab gesture), the player catches the bird. For example, when the calculated distance is within a reasonable value, such as 2 feet (a normal length of a full arm of a human), the algorithm will begin "recognizing" for the hand gesture (using some existing hand gesture recognizing techniques) in front of the back-facing camera. If the hand gesture is identified to be a "catching" gesture toward the monster's direction, then the monster can be considered to be "caught", and the game can move on to the next stage. This concept is depicted in FIG. 7.

Figure 8A:
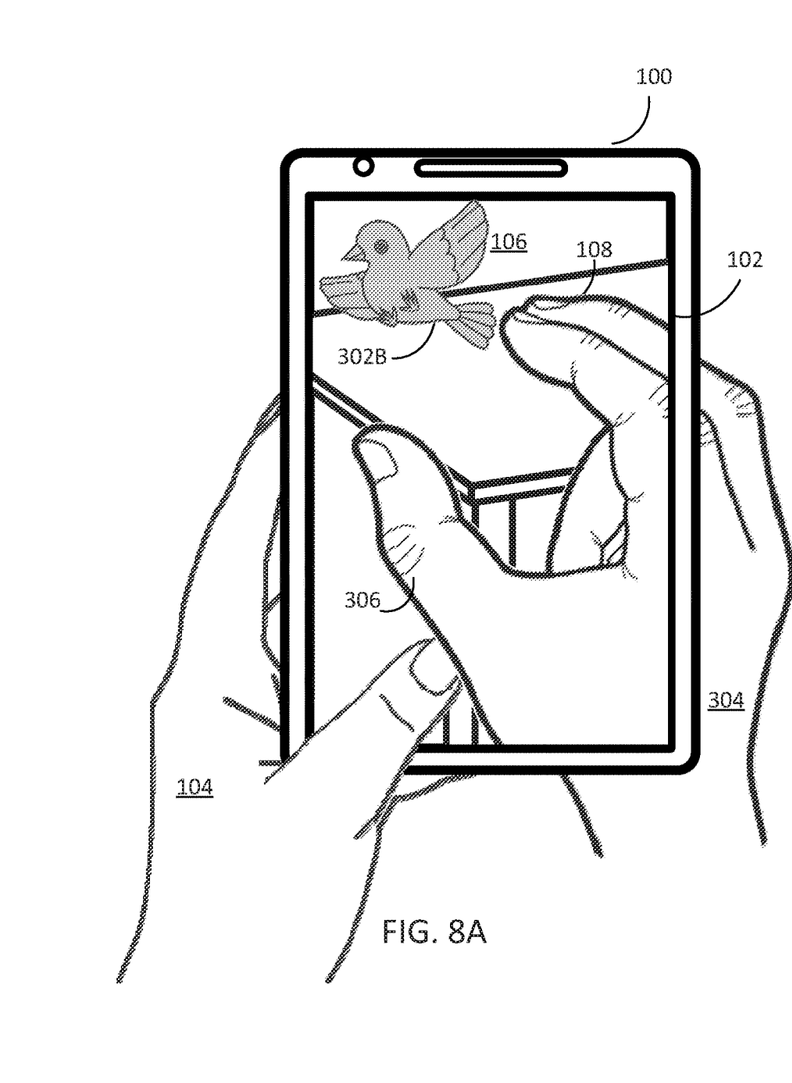
FIGS. 8A-8B depict an example of an updated AR view showing that the AR object is reacting to the user after the user missed capturing the AR object.
Figure 8B:
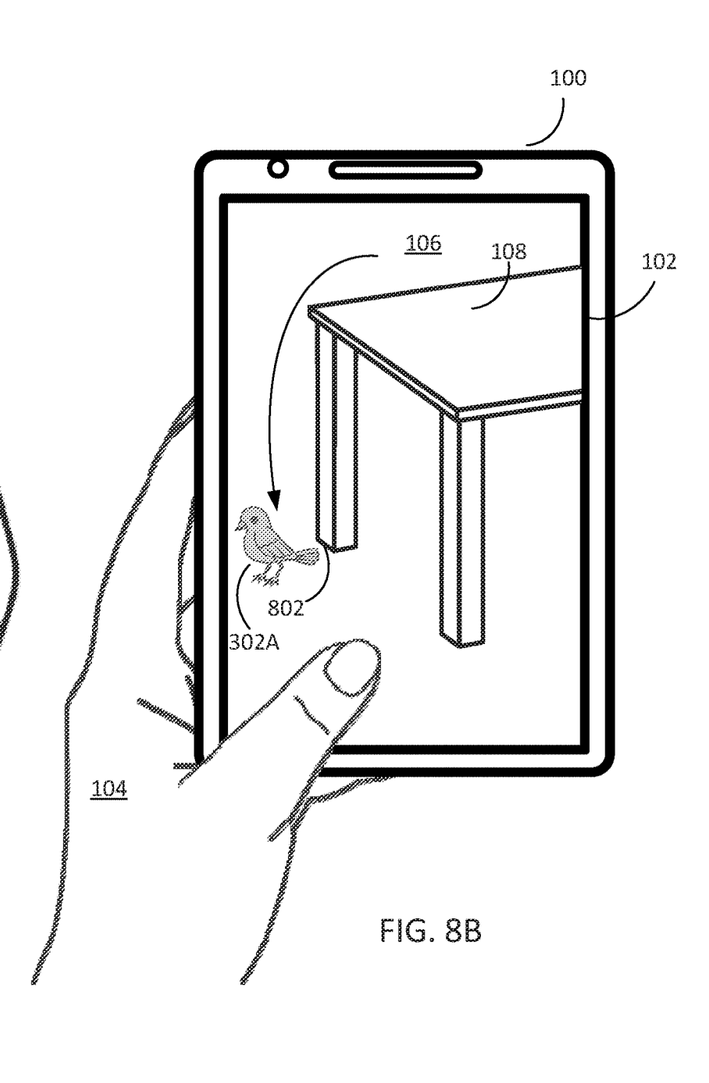

Otherwise, the bird is considered to be still free, the bird may move, and the "recognizing" algorithm will restart, such as depicted in FIGS. 8A-8B. In FIG. 8A (which comes temporally after FIG. 6), the player has failed to catch the bird and bird 302B (representing the same IAR object as bird 302A) flies away from image data 306 representing hand 304. In FIG. 8B, reference point 802 has been identified for the new location of bird 302A.

In some variations, a time factor can also be considered. For example, if the bird is not caught within certain period, it will start escaping to another location inside the IAR view (e.g., a reference point in the IAR background).

In some variations, the player may be required to use different hand gestures to catch different animals/characters. For example, a grabbing gesture may be required to catch a bird, while a first may be required to punch a monster (e.g., perform a punch gesture) before the player can catch it. When the player uses a first against the bird, he would not be able to catch the bird. Multiple gestures may need to be linked together as well. For example, a sequence of two or more gestures may need to be performed.

If the bird/monster/other character is still free, it may interactively "escape" from the player by moving to another location on the IAR view away from the player's hand. The "escape" can be interactively determined by the hand gesture as well. For example, the display of the bird/monster/other character can show that it is escaping to a location away from the player's hand motion, such as by moving the position of the graphical object presenting the IAR object and/or updating the appearance of the image data representing the IAR object.

The computerized object on the augmented reality view (the IAR object) can react to the hand-motion recognition result given by the back-facing camera based on any combination of one or more of the following analyses: hand gesture recorded from the back-facing Camera; hand gesture's moving direction; distance between the smart device and a reference point in the real-time background (IAR background) nearby the IAR object; time lapsed from the first appearance of the IAR object; or other factors.

The IAR object can interact with one or more of the analyzed results obtained from the above analysis. For example, the IAR object can move away from the hand gesture's direction (e.g., in order to escape from being caught); the size of the IAR object appeared on the IAR view may change based on the calculated distance between the smart device and the corresponding reference point. The IAR object may not need to react to the hand gesture if the distance between the smart device and the corresponding reference point is not within a specified range. Similarly, the IAR object may not need to react to the hand gesture if the moving direction of the hand gesture is not approaching the corresponding reference point. Similarly, the IAR object may not need to react to the hand gesture if the hand gesture is not the "expected" one. That is, the player can be required to use different hand gestures to "catch" different IAR objects.

Figure 9:
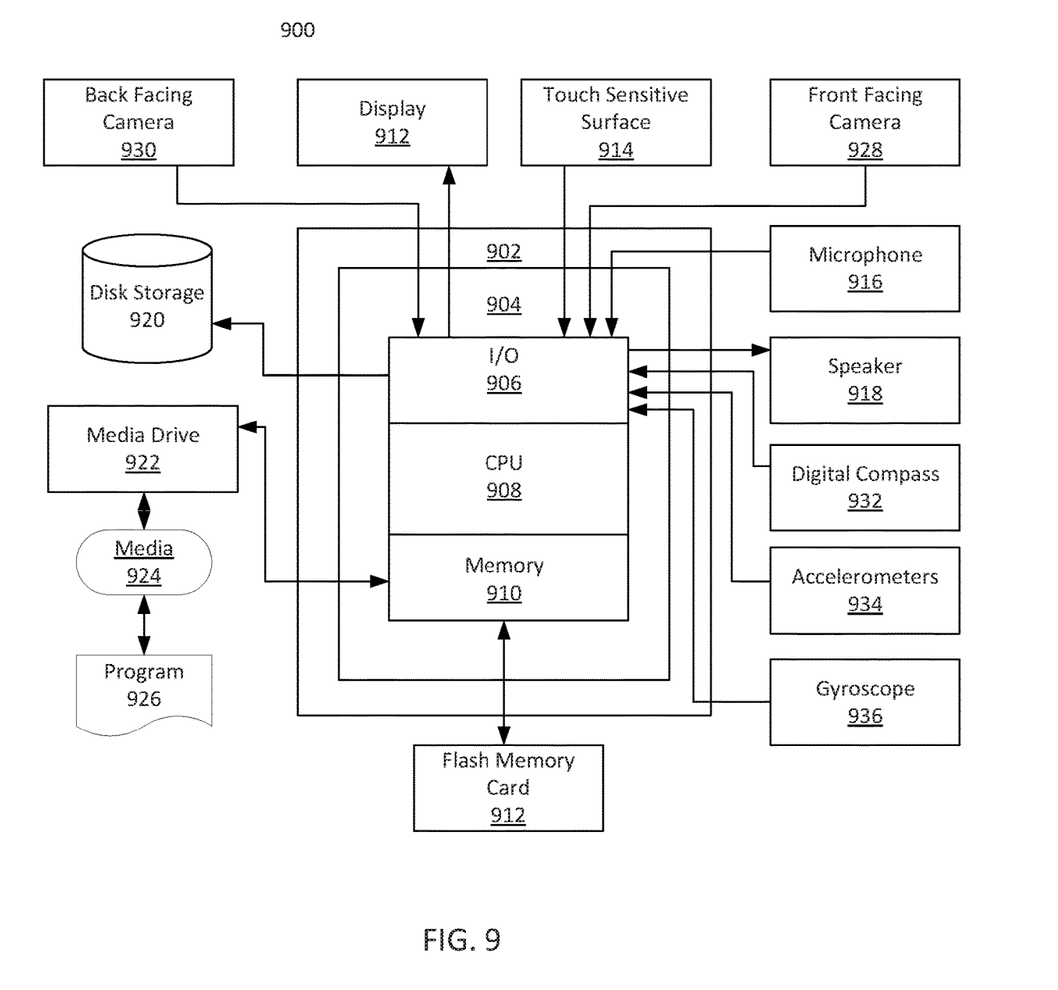
FIG. 9 depicts a system, such as a smart device, that may be used to implement various embodiments of the present invention.

Turning now to FIG. 9, components of an exemplary computing system 900, configured to perform any of the above-described processes and/or operations are depicted. For example, computing system 900 may be used to implement smart device 100 described above that implements any combination of the above embodiments or process 1000 described below with respect to FIG. 10. Computing system 900 may include, for example, a processor, memory, storage, and input/output peripherals (e.g., display, keyboard, stylus, drawing device, disk drive, Internet connection, camera/scanner, microphone, speaker, etc.). However, computing system 900 may include circuitry or other specialized hardware for carrying out some or all aspects of the processes.

In computing system 900, the main system 902 may include a motherboard 904, such as a printed circuit board with components mount thereon, with a bus that connects an input/output (I/O) section 906, one or more microprocessors 908, and a memory section 910, which may have a flash memory card 912 related to it. Memory section 910 may contain computer-executable instructions and/or data for carrying out process 1000 or any of the other processes described herein. The I/O section 906 may be connected to display 912 (e.g., to display a view), a touch sensitive surface 914 (to receive touch input and which may be combined with the display in some cases), a microphone 916 (e.g., to obtain an audio recording), a speaker 918 (e.g., to play back the audio recording), a disk storage unit 920, and a media drive unit 922. The media drive unit 922 can read/write a non-transitory computer-readable storage medium 924, which can contain programs 926 and/or data used to implement process 1000 or any of the other processes described above.

Additionally, a non-transitory computer-readable storage medium can be used to store (e.g., tangibly embody) one or more computer programs for performing any one of the above-described processes by means of a computer. The computer program may be written, for example, in a general-purpose programming language (e.g., Pascal, C, C++, Java, or the like) or some specialized application-specific language.

Computing system 900 may include various sensors, such as front facing camera 928 and back facing camera 930. These cameras can be configured to capture various types of light, such as visible light, infrared light, and/or ultra violet light. Additionally, the cameras may be configured to capture or generate depth information based on the light they receive. In some cases, depth information may be generated from a sensor different from the cameras but may nonetheless be combined or integrated with image data from the cameras. Other sensors included in computing system 900 include digital compass 932, accelerometer 934, and/or gyroscope 936. Other sensors and/or output devices (such as dot projectors, IR sensors, photo diode sensors, time-of-flight sensors, etc.) may also be included.

While the various components of computing system 900 are depicted as separate in FIG. 9, various components may be combined together. For example, display 912 and touch sensitive surface 914 may be combined together into a touch-sensitive display.

Figure 10:
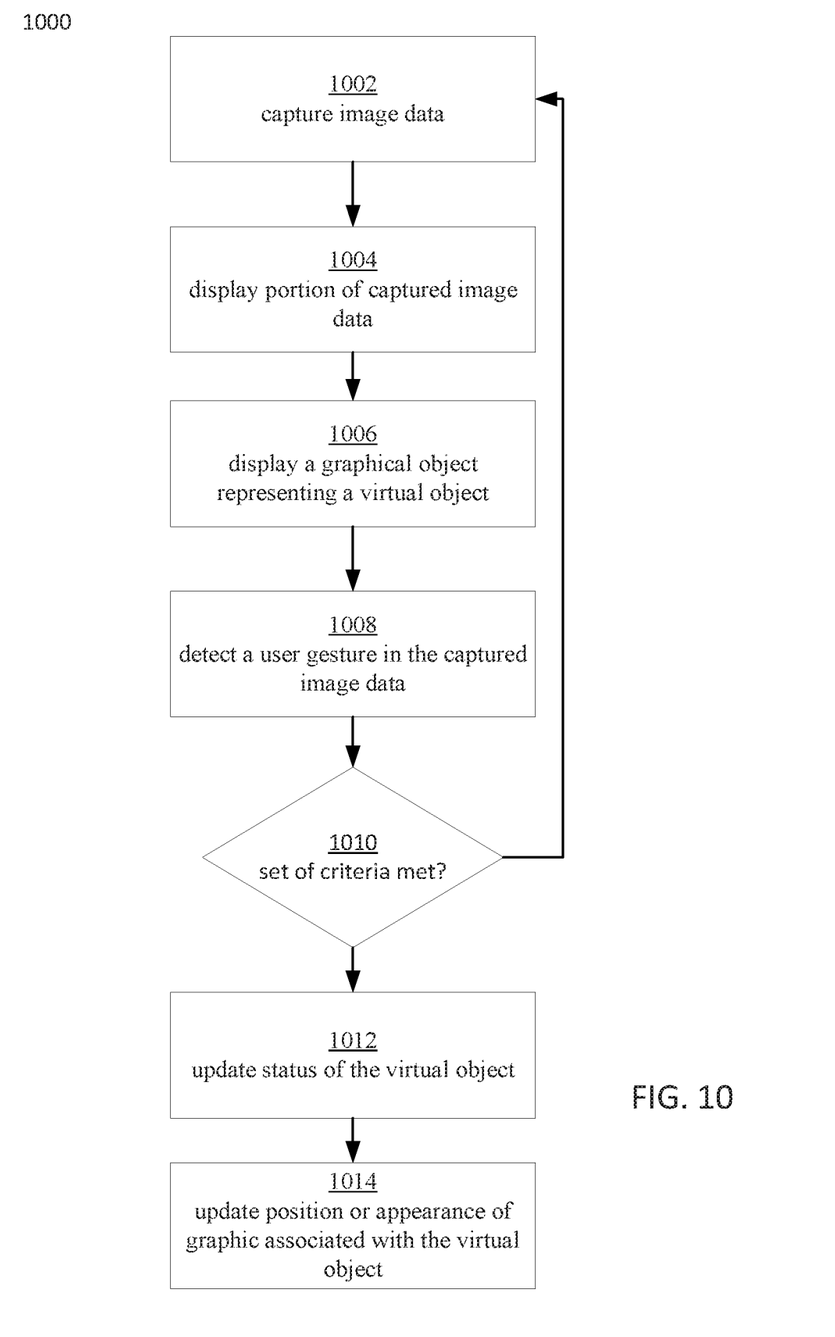
FIG. 10 depicts an exemplary process for implement some embodiments of the present technology.

FIG. 10 depicts a flowchart for process 1000 that implements some features of the present technology. Process 1000 is implemented on an electronic device, such as smart device 100 or computing system 900 described above with respect to FIGS. 1A-1B and FIG. 9, respectively. In some cases, the electronic device has one or more image sensors on one side of the device and a display on the opposite side of the device. Optionally, the display is a touch-sensitive display.

At block 1002, the one or more image sensors (e.g., as implemented in camera 124 of device 100 of FIGS. 1A-1B) capture image data of a scene (e.g., the scene of FIG. 2 that includes table 110). In some cases, the captured image data includes visible light image data. In some cases, the captured image data includes visible light image data as well as other types of image data, such as IR image data. The captured image data can also include depth information that indicates a measured distance to different portions of the scene represented in the captured image data. The image data can be still image data or video image data.

At block 1004, at least a portion of the captured image data from block 1002 is displayed on the display of the electronic device (e.g., display 102 of smart device 100 as depicted in FIG. 2). The portion of the captured image data is optionally the full captured image data, a cropped portion of the captured image data, or some other portion that is less than the full portion.

At block 1006, a graphical object is representing a virtual object is displayed over the displayed portion of the captured image data. For example, as depicted in FIG. 3A, graphical object in the form of bird 302A is displayed over the background image 106 captured from the back-facing camera of smart device 100. In FIG. 3B, a different graphical object in the form of bird 302B is displayed over the background image 106 captured from the back-facing camera of smart device 100. Graphical objects 302A and 302B of FIGS. 3A and 3B, respectively, represent and/or are associated with the same virtual object.

At block 1008 a user gesture is detected in the captured image data. For example, as depicted in FIGS. 6 and 7, a processor of smart device 100 performs image processing on the captured image data (e.g., when the captured image data is video data) and specifically image data 306 of hand 304 to determine whether a specific hand movement of hand 304 corresponds to any user gestures (e.g., predefined user gestures). If a user gesture is detected, the processor identifies the gestures (e.g., by type, location, orientation, and/or other gesture characteristics). For example, the user gesture is optionally one of a pinching gesture, a grabbing gesture, a punching gesture, a swiping gesture, or a slapping gesture. In some variations, the gesture is based on data other than or in addition to capture image data. For example, data from positioning/movement/orientation/location sensors in the electronic device may play a part in detecting a gesture. In some embodiments, the processing/analysis necessary for block 1008 is only started to executed in response to other criteria being met, such as the temporal and/or distance criteria described above and below.

At block 1010, a decision is made whether the detected gesture meets a set of criteria (e.g., one or more criteria). The set of criteria includes any of various types of criterion. For example, one criterion might be that the detected gesture is a specific type of gesture (e.g., the gesture is a pinching gesture or the gesture is a grabbing gesture. In some examples, a criterion is that the gesture must have been proceeded by a different gesture (e.g., a grabbing gesture must have been preceded by a punching gesture. In some example, a criterion is that the gesture must have occurred within a predefined distance of a reference point in the scene. The reference point can be selected based on features in the captured image data that have a relative position to the virtual object (e.g., the reference point is chosen based on the feature in the scene that corresponds to a feature in the captured image data that is next to the graphical object representing the virtual object, as explained above with respect to FIGS. 4 and 8B). The distance may be measured from the electronic device to the reference point, from a user's hand to the reference point or some other reference system. Another example of a criterion is a time threshold before which the gesture must have been detected. The expiration of a time threshold itself without detecting a particular type of gesture is another example criterion (e.g., if an open hand gesture is being detected and a threshold time expires, the set of criteria is met). Various triggering points can be used for the time threshold, such as from when a user's hand (or other object) is first detected in the captured image data, from when a gesture or start of a gesture is detected, or when a position of the virtual object has changed. The time threshold itself may be predetermined or random.

In some embodiments, in accordance with the set of criteria not being met, process 1000 may be restarted without changing anything related to the virtual object. A determination the set of criteria was not met need not be based on testing the entire set. For example, if a time threshold test is not met (e.g., a gesture or follow-on gesture is not performed within the required time) or a distance criteria is not met, other criteria need not be tested. In some variations, other sets of criteria may be used as perquisites to detecting the gesture so that the electronic device does not even attempt to detect a gesture until other criteria (e.g., another set of criteria) are met.

In block 1012, in accordance with the set of criteria being met, a status of the virtual object is updated. For example, the status of the virtual object can be updated from an indication that the virtual object is "loose" or free to move to an indication that the virtual object is "captured" or no longer free to move. As another example, the status of the virtual object can be updated from stationary to moving (e.g., if a player tries to grab a graphic representing the virtual object but fails, the virtual object may move away, as described above with respect to FIGS. 6 and 8A-8B). The status of the virtual object can be recorded in a data object or variable that is associated with, represents, and/or defines the virtual object.

In block 1014, the electronic device updates the position of the graphical object representing the virtual object based on the user gesture and/or replaces the display of the graphical object with a different graphical object (e.g., as depicted in FIGS. 8A-8B). For example, the virtual object may move in response to the user's open hand gesture getting close to the reference point without executing a grabbing gesture. Moving the virtual object may result in different graphical representations being displayed (e.g., standing bird 302A versus flying bird 302B in FIGS. 8A-8B). While the two graphical objects have different appearances, they are both associated with and/or represent the same virtual object.

Various exemplary embodiments are described herein. Reference is made to these examples in a non-limiting sense. They are provided to illustrate more broadly applicable aspects of the disclosed technology. Various changes may be made and equivalents may be substituted without departing from the true spirit and scope of the various embodiments. In addition, many modifications may be made to adapt a particular situation, material, composition of matter, process, process act(s) or step(s) to the objective(s), spirit or scope of the various embodiments. Further, as will be appreciated by those with skill in the art, each of the individual variations described and illustrated herein has discrete components and features which may be readily separated from or combined with the features of any of the other several embodiments without departing from the scope or spirit of the various embodiments.

What is claimed is:

1. A method comprising:
    at an electronic device having a display on one side of the device and one or more image sensors on the opposite side of the device:
        capturing image data using the one or more image sensors;
        displaying on the display a portion of the captured image data on the display;
        displaying on the display a first graphical object representing a virtual object over the displayed portion of the captured image data, wherein a displayed position of the first graphical object is based on a position of the virtual object;
        detecting a user gesture after display of the first graphical object using the one or more image sensors, wherein the detected gesture includes multiple gestures linked together including a first portion and a second portion and the user gesture is visible in the displayed portion of the captured image data;
        in accordance with a determination that a first portion of the detected user gesture meets a set of criteria, updating a position of the virtual object to follow a second portion of the user gesture visible in the displayed portion of the captured image data or replacing the display of the first graphical object with a second graphical object; and in accordance with a determination that the first portion of the detected user gesture does not meet the set of criteria, updating the position of the virtual object to move away from the user gesture.

2. The method of claim 1 further comprising:
identifying a feature in image data captured from the one or more image sensors.

3. The method of claim 2, wherein the set of criteria includes a criterion based on a direction of the user gesture with respect to the graphical object displayed on the display.

4. The method of claim 2, wherein the set of criteria includes a criterion based on a distance of the gesture to the feature.

5. The method of claim 2 further comprising:
in accordance with a determination that a distance from the electronic device to the feature has increased, reducing the displayed size of the first graphical object; and
in accordance with a determination that a distance from the electronic device to the feature has decreased, increasing the displayed size of the first graphical object.

6. The method of claim 1, wherein the set of criteria includes a criterion based on whether the user gesture matches a first predefined gesture.

7. An electronic device comprising:
a display on one side of the device;
one or more image sensors on the opposite side of the device;
a processor; and
memory encoded with a computer programing having instructions executable by the processor, wherein the instructions are for:
capturing image data using the one or more image sensors;
displaying on the display a portion of the captured image data on the display;
displaying on the display a first graphical object representing a virtual object over the displayed portion of the captured image data, wherein a displayed position of the first graphical object is based on a position of the virtual object;
detecting a user gesture after display of the first graphical object using the one or more image sensors, wherein the detected gesture includes multiple gestures linked together including a first portion and a second portion and the user gesture is visible in the displayed portion of the captured image data;
in accordance with a determination that a first portion of the detected user gesture meets a set of criteria, updating a position of the virtual object to follow a second portion of the user gesture visible in the displayed portion of the captured image data or replacing the display of the first graphical object with a second graphical object; and
in accordance with a determination that the first portion of the detected user gesture does not meet the set of criteria, updating the position of the first graphical object to move away from the user gesture.

8. A non-transitory computer-readable storage medium encoded with a computer program executable by an electronic device having a display on one side of the device and one or more image sensors on the opposite side of the device, the computer program comprising instructions for:
capturing image data using the one or more image sensors;
displaying on the display a portion of the captured image data on the display;
displaying on the display a first graphical object representing a virtual object over the displayed portion of the captured image data, wherein a displayed position of the first graphical object is based on a position of the virtual object;
detecting a user gesture after display of the first graphical object using the one or more image sensors, wherein the detected gesture includes multiple gestures linked together including a first portion and a second portion and the user gesture is visible in the displayed portion of the captured image data;
in accordance with a determination that a first portion of the detected user gesture meets a set of criteria, updating a position of the virtual object to follow a second portion of the user gesture visible in the displayed portion of the captured image data or replacing the display of the first graphical object with a second graphical object; and
in accordance with a determination that the first portion of the detected user gesture does not meet the set of criteria updating the position of the first graphical object to move away from the user gesture.

9. A method comprising:
at an electronic device having a display on one side of the device and one or more image sensors on the opposite side of the device:
capturing image data of a scene using the one or more image sensors;
displaying on the display a portion of the captured image data on the display;
displaying on the display a first graphical object over the displayed portion of the captured image data at a first position, the first graphical object representing a virtual object, wherein a displayed position of the first graphical object is based on a position of the virtual object and the user gesture is visible in the displayed portion of the captured image data;
detecting a user gesture after display of the first graphical object from the captured image data, wherein the detected gesture includes multiple gestures linked together including a first portion and a second portion;
in accordance with a determination that a first portion of the detected user gesture meets a set of criteria:
updating a status of the virtual object to a first state; and
updating the position of the graphical object to follow a second portion of the user gesture visible in the displayed portion of the captured image data or replacing the display of the first graphical object with a second graphical object, wherein the second graphical object is associated with the updated status of the virtual object; and
in accordance with a determination that the first portion of the detected user gesture does not meet the set of criteria:
updating the status of the virtual object to a second state different than the first state; and
updating the position of the graphical object to move away from the user gesture or replacing the display of the first graphical object with a second graphical object, wherein the second graphical object is associated with the updated status of the virtual object.

10. The method of claim 9 further comprising:
selecting a reference point in the scene.

11. The method of claim 10, wherein the selection of the reference point in the scene is based on the portion of the scene that corresponds to first position in the displayed portion of the captured image data.

12. The method of claim 10, wherein selecting the reference point in the scene includes identifying a feature in the captured image data near the first position and assigning the reference point to the portion of the scene corresponding to the feature.

13. The method of claim 9, wherein the set of criteria includes a criterion based on the distance of the gesture to a reference point in the scene.

14. The method of claim 9, wherein the set of criteria includes a criterion based on the type of gesture detected.

15. The method of claim 9, wherein the set of criteria includes a criterion based on whether the type of gesture detected is associated with a type of the virtual object.

16. The method of claim 9, wherein the set of criteria includes a criterion based on whether the gesture was detected within a threshold amount of time.

17. The method of claim 9, wherein the updated status indicates that the virtual object has been captured.

18. The method of claim 9, wherein the updated status indicates that the virtual object is still free to move.

* * * * *